United States Patent
Brown, III et al.

(10) Patent No.: US 9,492,953 B2
(45) Date of Patent: Nov. 15, 2016

(54) METHOD FOR MAKING ELONGATE GLOVE, SUCH AS NITRILE GLOVE FOR GLOVE BOX, ON PORCELAIN MOLD

(75) Inventors: James Walter Brown, III, Hanahan, SC (US); Charles Terrence Brown, John's Island, SC (US)

(73) Assignee: North Safety Products, Inc., Cranston, RI (US)

( * ) Notice: Subject to any disclaimer, the term of this patent is extended or adjusted under 35 U.S.C. 154(b) by 1622 days.

(21) Appl. No.: 11/358,652

(22) Filed: Feb. 21, 2006

(65) Prior Publication Data
US 2007/0126149 A1    Jun. 7, 2007

Related U.S. Application Data

(60) Provisional application No. 60/742,741, filed on Dec. 6, 2005.

(51) Int. Cl.
| | |
|---|---|
| *B29C 41/08* | (2006.01) |
| *A41D 19/00* | (2006.01) |
| *B29C 41/14* | (2006.01) |
| *B29C 33/38* | (2006.01) |

(52) U.S. Cl.
CPC ............. *B29C 41/14* (2013.01); *B29C 41/08* (2013.01); *B29C 33/38* (2013.01); *B29K 2909/02* (2013.01)

(58) Field of Classification Search
USPC .......... 264/301, 305, 306, 219–227; 223/78; 2/161.6, 161.7
See application file for complete search history.

(56) References Cited

U.S. PATENT DOCUMENTS

| | | | |
|---|---|---|---|
| 2,895,206 A * | 7/1959 | Hemphill, Jr. ................. | 249/55 |
| 3,025,403 A | 3/1962 | Belknap et al. | |
| 3,197,786 A * | 8/1965 | Velonis et al. .................... | 2/167 |
| 3,255,492 A | 6/1966 | Velonis et al. | |
| 3,876,900 A * | 4/1975 | Amatsuka et al. ........... | 313/510 |
| 4,123,123 A * | 10/1978 | Sato et al. ........................ | 312/1 |
| 4,329,312 A * | 5/1982 | Ganz ............................ | 264/306 |
| 5,284,607 A * | 2/1994 | Chen ......................... | 264/37.18 |
| 5,833,911 A * | 11/1998 | Llort et al. .................... | 264/301 |
| 5,993,923 A | 11/1999 | Lee | |
| 6,299,442 B1 * | 10/2001 | Shiao et al. .................... | 433/64 |
| 2004/0231027 A1 * | 11/2004 | Lee .................................. | 2/159 |
| 2005/0035493 A1 | 2/2005 | Flather et al. | |
| 2005/0124200 A1 * | 6/2005 | Nudd et al. .................. | 439/346 |
| 2006/0229755 A1 | 10/2006 | Kuiken et al. | |

OTHER PUBLICATIONS

Extended European Search Report for application No. 06802199.7, May 10, 2011.

* cited by examiner

*Primary Examiner* — Magali P Slawski
(74) *Attorney, Agent, or Firm* — Wood, Phillips, Katz, Clark & Mortimer (57) ABSTRACT

When an elongate glove, such as a nitrile glove for a glove box, is made on a porcelain mold having a hand-defining portion, having an arm-defining portion, which extends from the hand-defining portion and which has an overall length at least two or more times the overall length of the hand-defining portion, having a substantially conical sub-portion, which flares upwardly and outwardly, when the porcelain mold is oriented in a dipping orientation, substantially the entire exterior of the porcelain mold is sandblasted before the porcelain mold is dipped successively into a bath containing a coagulating agent and into a bath containing a latex, then allowed to dwell in the bath containing the latex until enough of the latex coagulates to form a wet latex film on the porcelain mold, and then withdrawn with the wet latex film formed thereon from the bath containing the latex.

21 Claims, 11 Drawing Sheets

DEPTH (%)

DEPTH (%)

DEPTH (%)

DEPTH (%)

METHOD FOR MAKING ELONGATE GLOVE, SUCH AS NITRILE GLOVE FOR GLOVE BOX, ON PORCELAIN MOLD

CROSS-REFERENCE TO RELATED APPLICATION

This application claims the benefit of Provisional Application No. 60/742,741, which was filed on Dec. 6, 2005, and the disclosure of which is incorporated herein by reference.

TECHNICAL FIELD OF THE INVENTION

This invention pertains to a method for making an elongate glove, such as an elongate glove for a glove box, on a porcelain mold. It is contemplated by this invention that at least a portion of the porcelain mold is sandblasted.

BACKGROUND OF THE INVENTION

As utilized widely in the semiconductor industry, in the pharmaceutical industry, and in diverse other industries, glove boxes are equipped with elongate gloves, into which workers can insert their hands and their arms and which enable them to handle materials, to conduct tests, and to perform other operations, in controlled environments. Typically, an elongate glove for a glove box has a hand-covering portion and an arm-covering portion, which extends from the hand-covering portion and which has an overall length at least two or more times the overall length of the hand-covering portion, e.g., an overall length of about 1000 millimeters. The overall length of a glove, such as an elongate glove for a glove box, is measured along a centerline extending from the tip of the middle finger-covering region of its hand-covering portion to the mouth of its arm-covering portion.

Commonly, a shorter glove, e.g., a glove having an overall length of about 450 millimeters, when measured similarly, is made on a porcelain mold having a glazed exterior by successive steps of dipping the porcelain mold successively into a bath containing a coagulating agent and into a bath containing a latex, then allowing the porcelain mold to dwell in the bath containing the latex until enough of the latex coagulates to form a wet latex film on the porcelain mold, and then withdrawing the porcelain mold having the wet latex film formed thereon from the bath containing the latex. After the wet latex film has dried, the resultant glove is stripped from the porcelain mold.

However, it can be very difficult to make an elongate glove, such as a glove having its arm-covering portion with an overall length at least two or more times the overall length of its hand-covering portion, by similar steps, because a wet latex film is heavy and tends to slide down a porcelain mold having a glazed exterior, particularly if the porcelain mold has a substantially conical region, which flares upwardly and outwardly, when the porcelain mold is oriented in a dipping orientation. Heretofore, various expedients, such grooves formed in a porcelain mold having a glazed exterior or tape applied onto such a mold, have been devised to counter the tendency of a wet latex film to slide down a porcelain mold having a glazed exterior, particularly if the porcelain mold has a substantially conical region, which flares upwardly and outwardly, when the porcelain mold is oriented in a dipping orientation.

Heretofore, as exemplified in U.S. Pat. No. 4,329,312, it has been known to sandblast selected areas on the hand-defining portion of a porcelain form, so as to provide a resultant glove with textured gripping surfaces on its hand-defining portion.

SUMMARY OF THE INVENTION

This invention provides an improvement in a method for making an elongate glove on a porcelain mold having a hand-defining portion and having an arm-defining portion, which extends from the hand-defining portion and which has an overall length at least two or more times the overall length of the hand-defining portion. The porcelain mold may have a substantially conical region, which flares upwardly and outwardly, when the porcelain mold is oriented in a dipping orientation.

The improvement comprises a step of sandblasting or texturing the exterior of at least the arm-defining portion of the porcelain mold before steps of dipping the porcelain mold successively into a bath containing a coagulating agent and into a bath containing a latex, then allowing the porcelain mold to dwell in the bath containing the latex until enough of the latex coagulates to form a wet latex film on the porcelain mold, and then withdrawing the porcelain mold having the wet latex film formed thereon from the bath containing the latex. Preferably, in the sandblasting step, substantially the entire exterior of the porcelain mold is sandblasted. Although this invention can be advantageously practiced if the latex is a nitrile latex, this invention is not limited to the latex being a nitrile latex.

DETAILED DESCRIPTION OF THE ILLUSTRATED MODE

Figure 1:
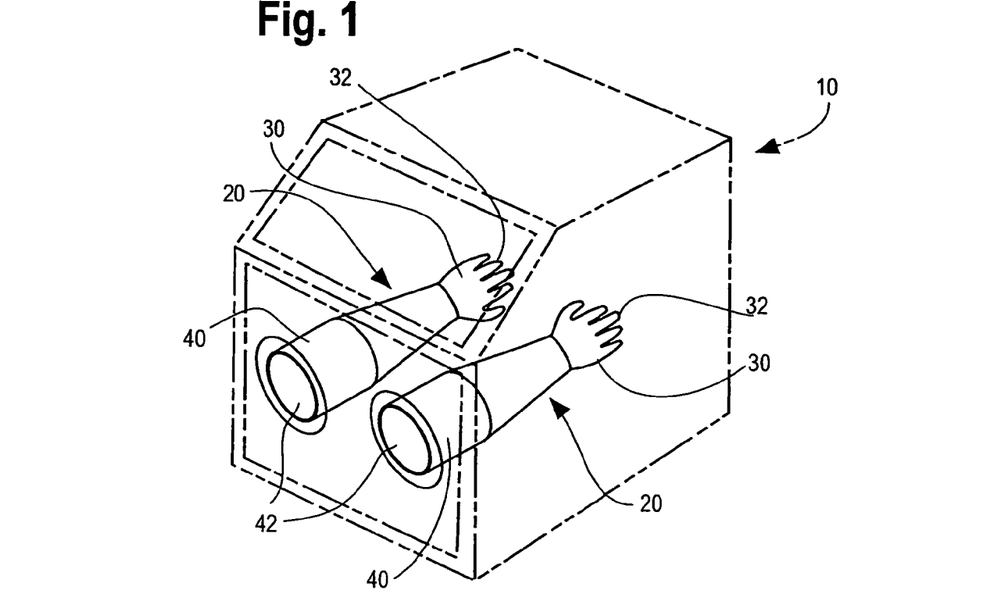
FIG. 1 is a schematic view of a glove box, which has two elongate gloves. Except for the elongate gloves, the glove box is illustrated in broken lines.

As illustrated schematically in FIG. 1, a glove box 10 is equipped with two elongate gloves 20, into each of which a worker can inset one hand and one arm and which enable the worker to handle materials, to conduct tests, and to perform other operations, in a controlled environments within the glove box. Each elongate glove 20 has a hand-covering portion 30 and an arm-covering portion 40, which extends from the hand-covering portion 30 and which has an overall length at least two or more times the overall length of the hand-covering portion 30, e.g., an overall length of about 1000 millimeters. The overall length of each elongate glove 20 is measured along a centerline extending from the tip of the middle finger-covering region 32 of its hand-covering portion to the mouth 42 of its arm-covering portion 40.

Figure 2:
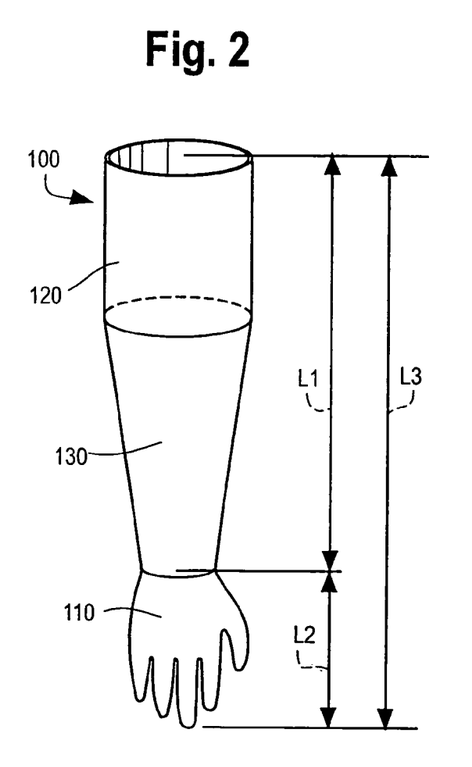
FIGS. 2 and 3 are perspective views of a porcelain mold, which exemplifies the porcelain molds used to make the elongate gloves, respectively before and while substantially the entire exterior of the porcelain mold is being sandblasted.
Figure 3:
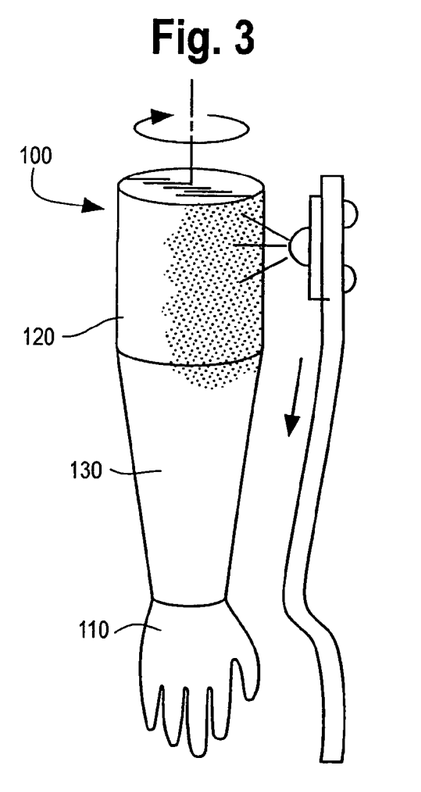

Each elongate glove 20 is made on a porcelain mold, as exemplified by a porcelain mold 100, which is illustrated in FIG. 2 and in other views. The porcelain mold 100 has a hand-defining portion 110, which defines the hand-covering portion of an elongate glove made on the porcelain mold 100, and an arm-defining portion 120, which defines the arm-covering portion of an elongate glove made on the porcelain mold 100. The arm-defining portion 120 has a substantially conical region 130, which flares upwardly and outwardly, when the porcelain mold 100 is oriented in a dipping orientation, in which the porcelain mold 100 is illustrated in FIG. 2.

As illustrated schematically in FIG. 2, this invention contemplates that at least the arm-defining portion 120 of the porcelain mold 100 is sandblasted. In a preferred mode for carrying out this invention, substantially the entire exterior of the porcelain mold 10 is sandblasted. In either case, it is convenient to refer to the porcelain mold 100 as having been sandblasted.

Figure 4:
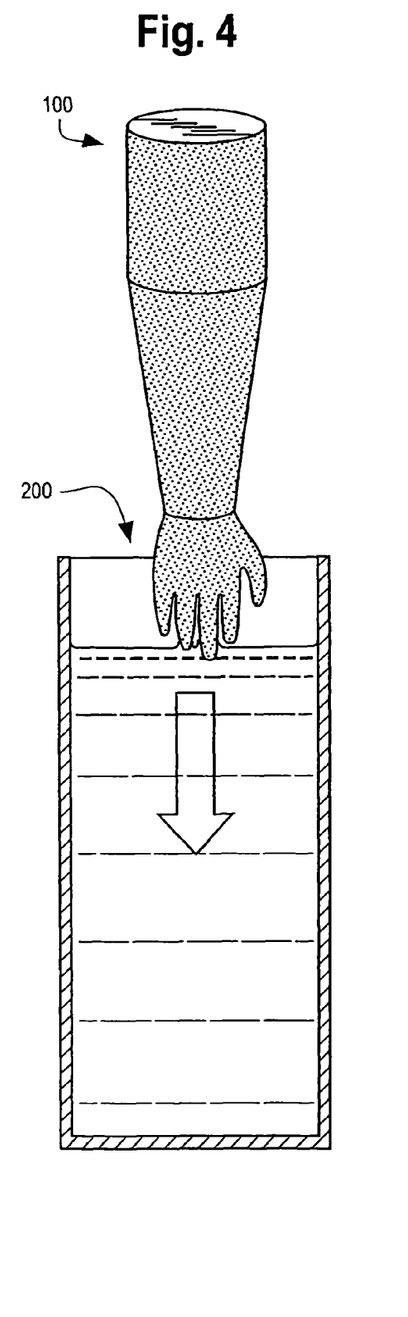
FIG. 4 is a schematic view of the sandblasted mold being dipped into a first bath containing a coagulant.
Figures 5, 5A:
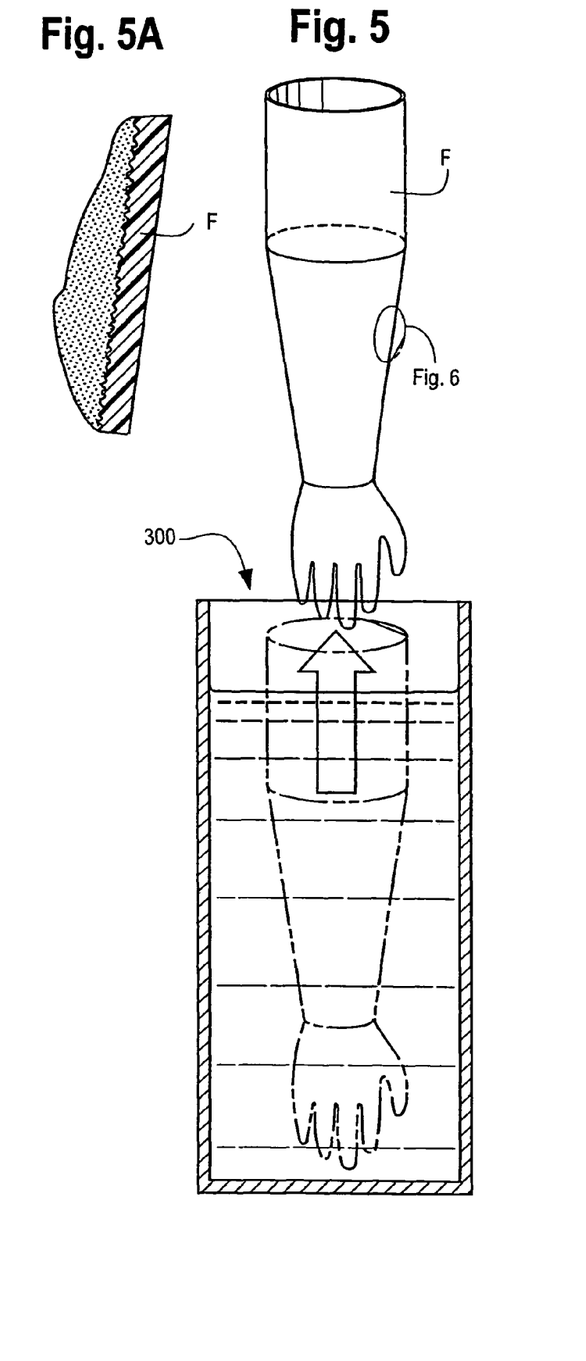
FIG. 5 is a schematic view of the sandblasted mold being withdrawn from a second bath containing a latex, after enough of the latex has coagulated to form a wet latex film on the porcelain mold.
FIG. 5A is an enlarged, fragmentary detail, which illustrates the wet latex film in cross-section and which is taken as and where indicated in FIG. 5.
Figure 6A:
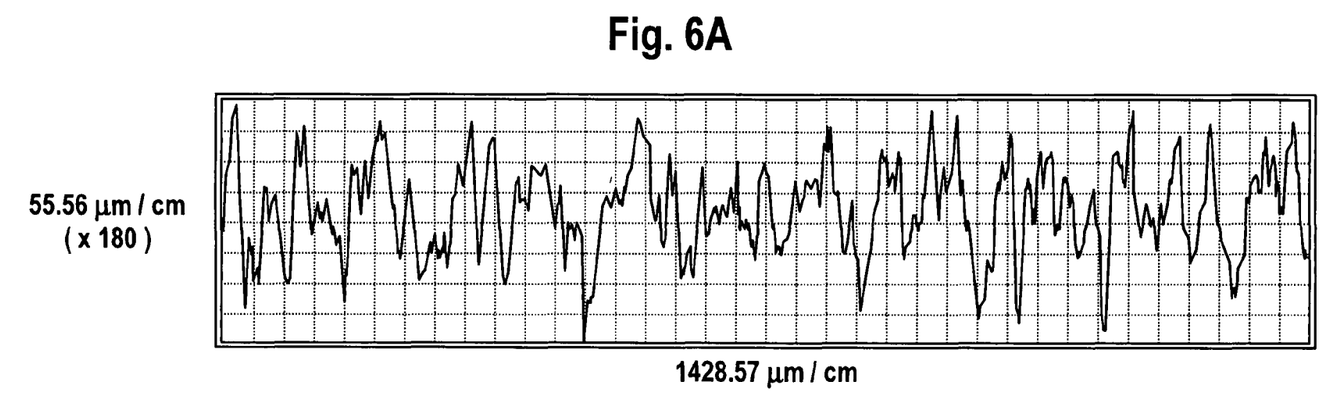
FIGS. 6A and 6B, 7A and 7B, 8A and 8B, 9A and 9B, 10A and 10B, 11A and 11B, 12A and 12B, 13A*a* and 13B, and 14A and 14B are paired graphs of depth data from measurements along a porcelain mold, as discussed hereinbelow.

As illustrated schematically in FIGS. 4, 5, and 6, the porcelain mold 100, so sandblasted, is dipped successively into a bath 200 containing a coagulating agent and into a bath 300 containing a latex, then allowed to dwell in the bath 300 containing the latex until enough of the latex coagulates to form a wet latex film F on the porcelain mold 100, and then withdrawn with the wet latex film F formed thereon from the bath 300 containing the latex. After the wet latex film F has dried, the resultant glove 20 is stripped from the porcelain mold 100.

Because at least the arm-defining portion 120 of the porcelain mold 100 was sandblasted before the porcelain mold 100, so sandblasted, was dipped into the batch 200 containing the coagulant, the wet latex film F formed on the porcelain mold 100 in the bath 300 does not slide down the porcelain mold 100, when the porcelain mold 100 with the wet latex film F formed thereon from the bath 300 containing the latex.

Depth data are presented, graphically, from three traces along a first area on a porcelain mold, in FIGS. 6A and 6B, FIGS. 7A and 7B, and FIGS. 8A and 8B, respectively, from three traces along a second area on the porcelain mold, in FIGS. 9A and 9B, FIGS. 10A and 10B, and FIGS. 11A and 11B, respectively, and from three traces along a third area on the porcelain mold, in FIGS. 12A and 12B, FIGS. 13A and 13B, and FIGS. 14A and 14B, respectively.

Figure 7A:
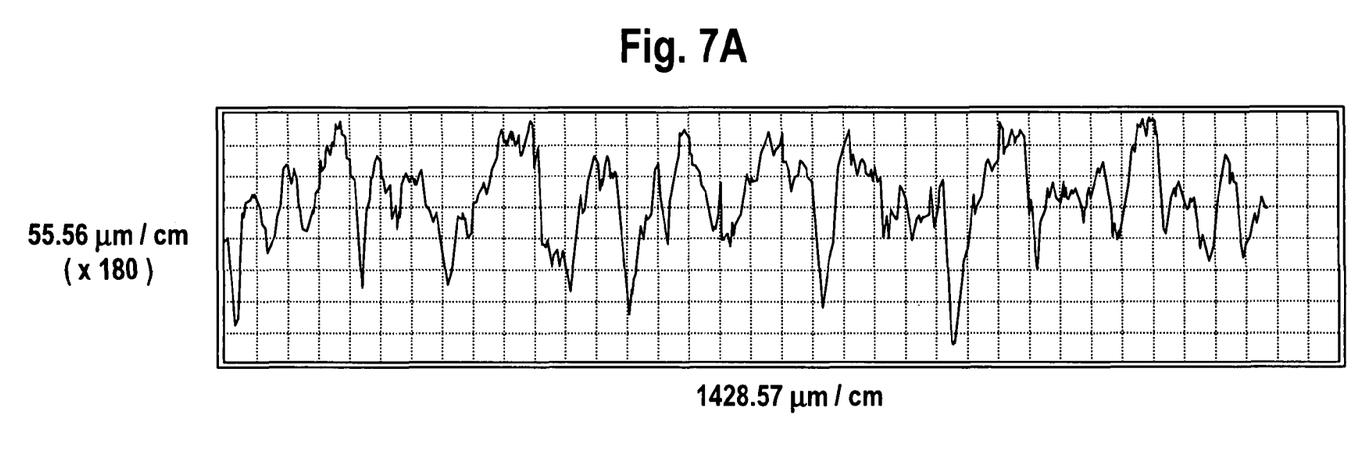
Figure 8A:
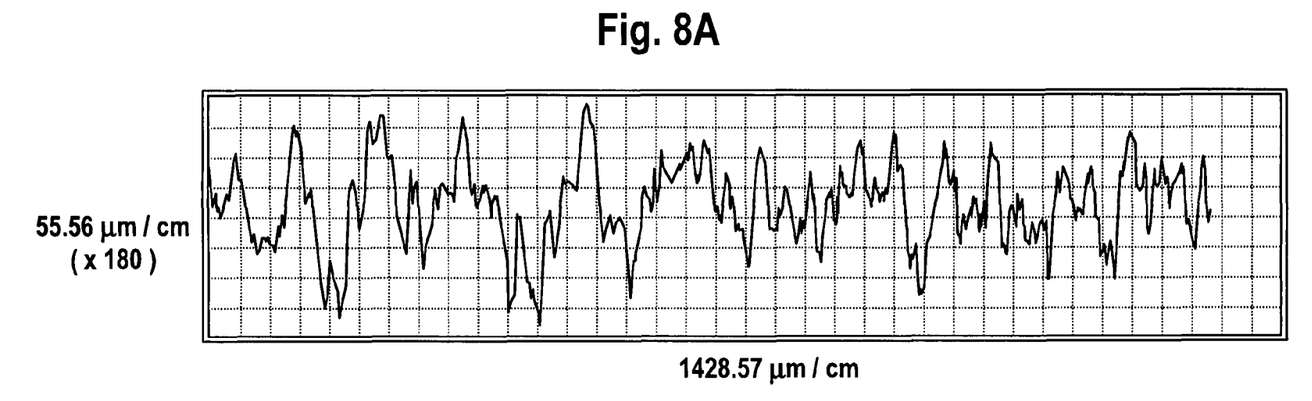

On grids of one centimeter by one centimeter, for first, second, and third traces along the first area, FIG. 6A, FIG. 7A, and FIG. 8A, respectively, present, on the x-axis, amplified measurements along the trace and, on the y-axis, amplified depths, as measured by a profilometer.

Figure 6B:
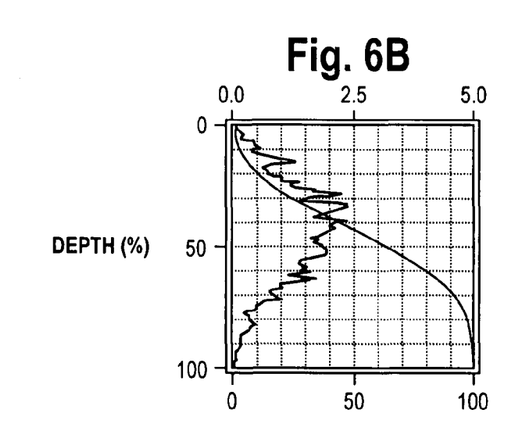
Figure 7B:
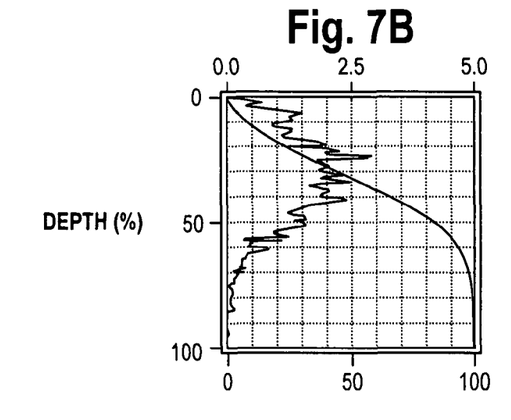
Figure 8B:
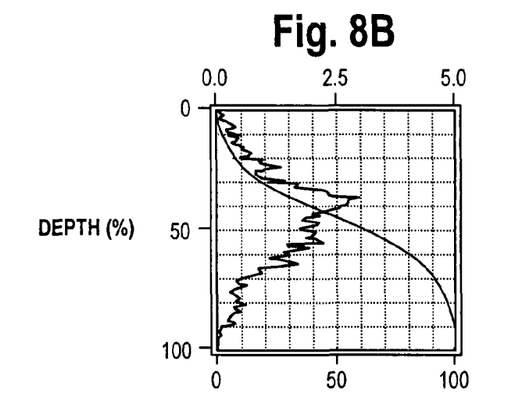

On similar grids, FIG. 6B, FIG. 7B, and FIG. 8B, respectively, for the same traces present the statistical distribution of the measured depths [ from the shallowest ("0") to the deepest ("100")] and, further, the percentages of the surface area that would remain if all material of the porcelain mold above the measured depths were removed.

For each of those traces along the first area, the roughness average (Ra) has been computed. For the first trace along the first area, Ra=30.12 µm. For the second trace along the first area, Ra=26.11 µm. For the third trace along the first area, Ra=21.77 µm.

Figure 9A:
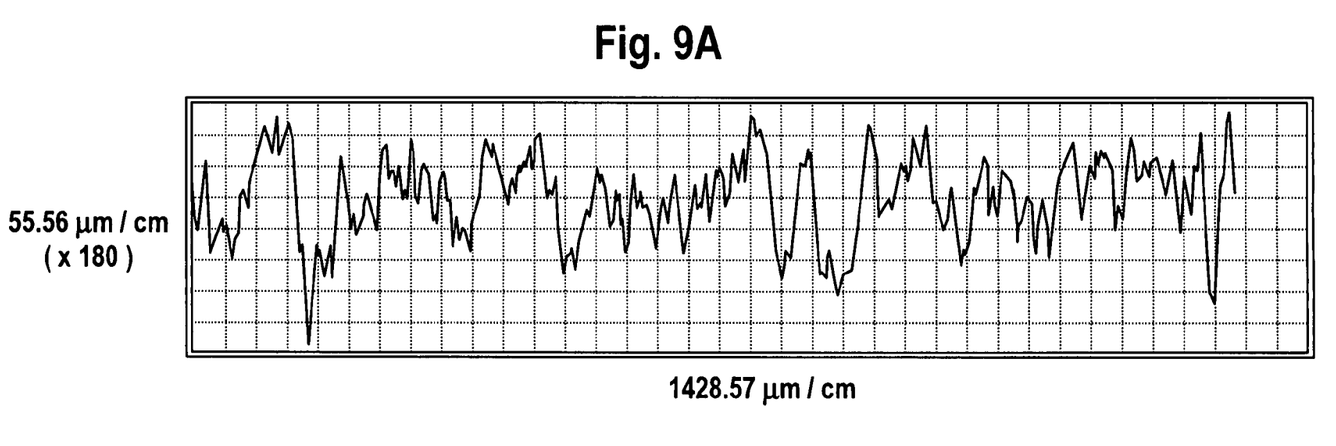
Figure 10A:
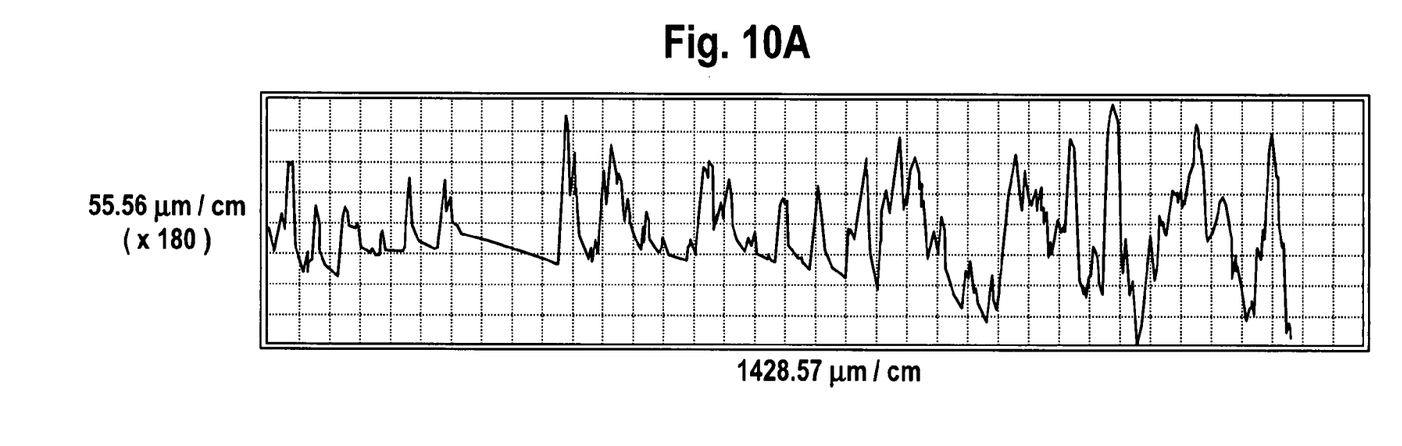
Figure 11A:
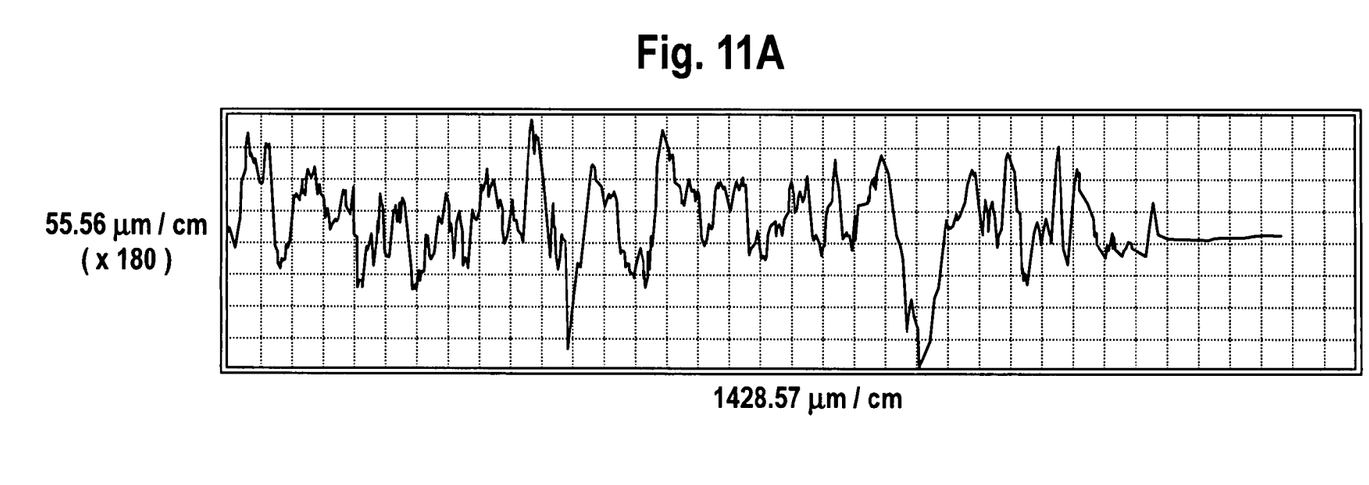

On grids of one centimeter by one centimeter, for first, second, and third traces along the second area, FIG. 9A, FIG. 10A, and FIG. 11A, respectively, present, on the x-axis, amplified measurements along the trace and, on the y-axis, amplified depths, as measured by a profilometer.

Figure 9B:
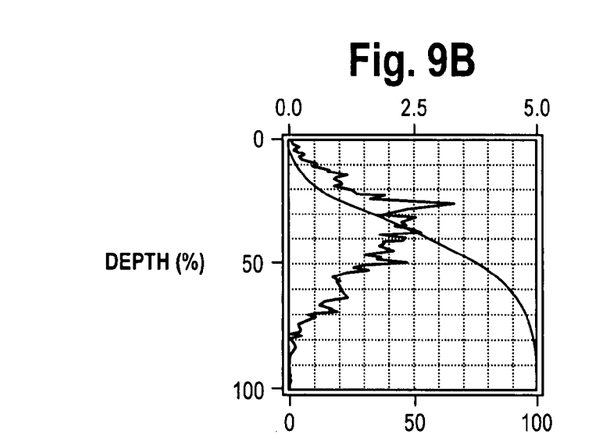
Figure 10B:
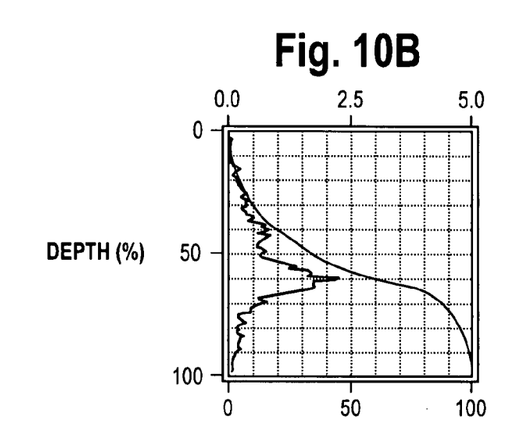
Figure 11B:
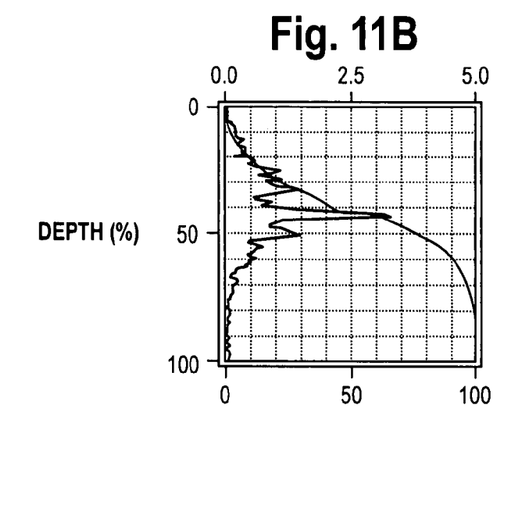

On similar grids, FIG. 9B, FIG. 10B and FIG. 11B, respectively, for the same traces present the statistical distribution of the measured depths [ from the shallowest ("0") to the deepest ("100")] and, further, the percentages of the surface area that would remain if all material of the porcelain mold above the measured depths were removed.

For each of those traces along the second area, the roughness average (Ra) has been computed. For the first trace along the second area, Ra=30.60 µm. For the second trace along the second area, Ra=18.24 µm. For the third trace along the second area, Ra=26.11 µm.

Figure 12A:
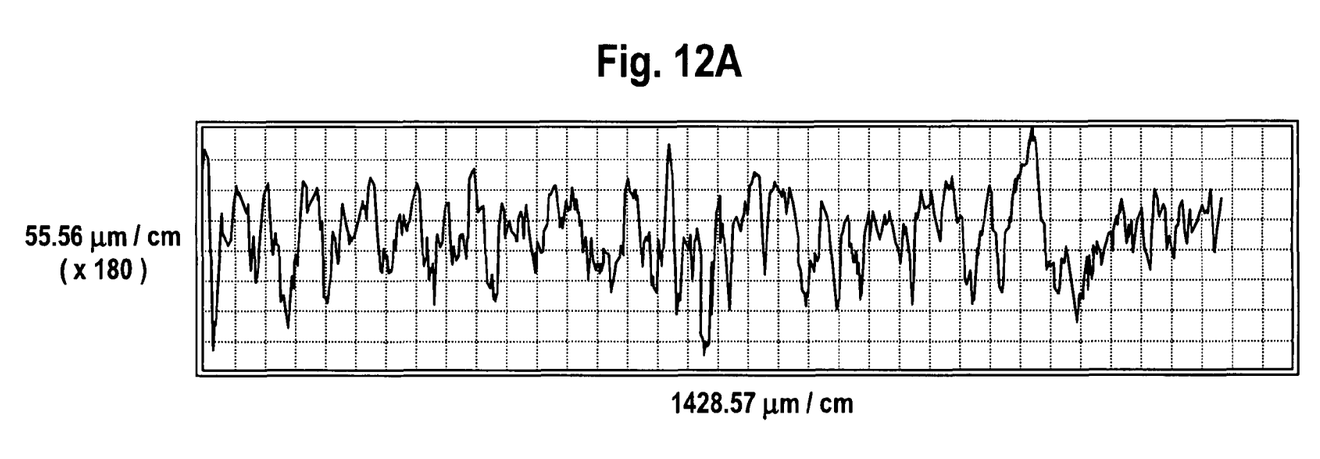
Figure 13A:
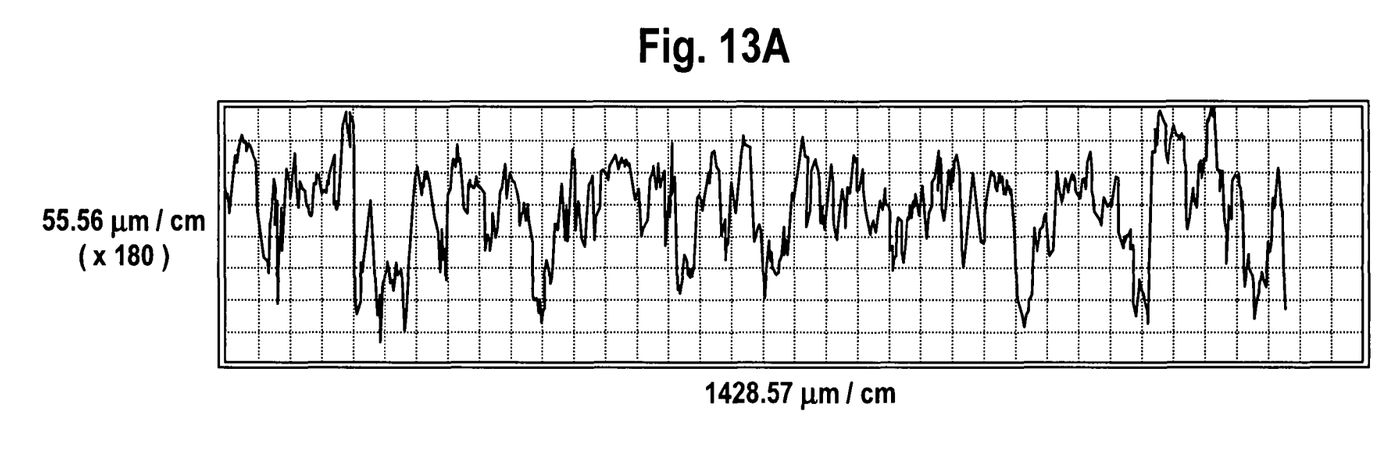
Figure 14A:
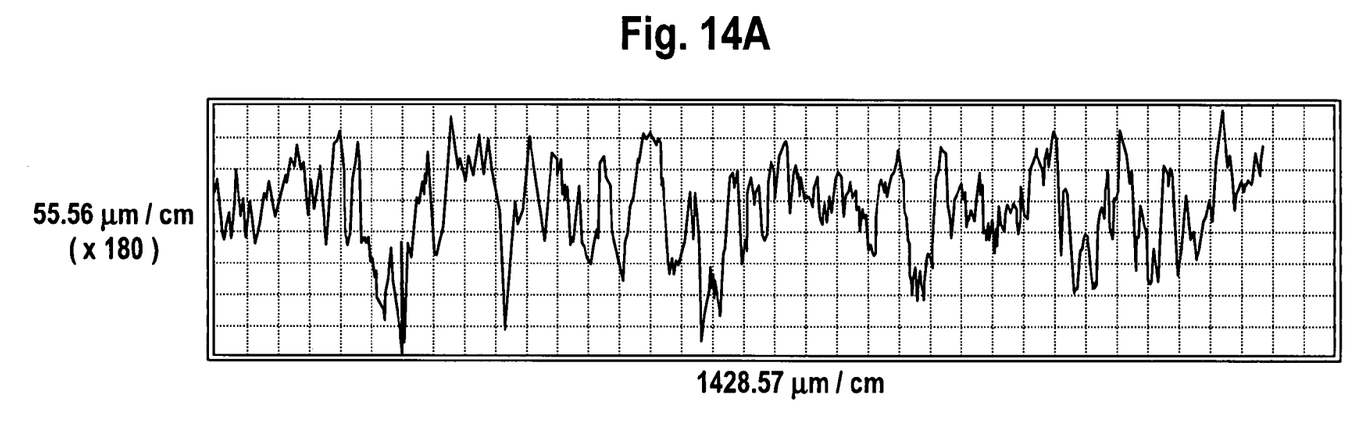

On grids of one centimeter by one centimeter, for first, second, and third traces along the third area, FIG. 12A, FIG. 13A, and FIG. 14A, respectively, present, on the x-axis, amplified measurements along the trace and, on the y-axis, amplified depths, as measured by a profilometer.

Figure 12B:
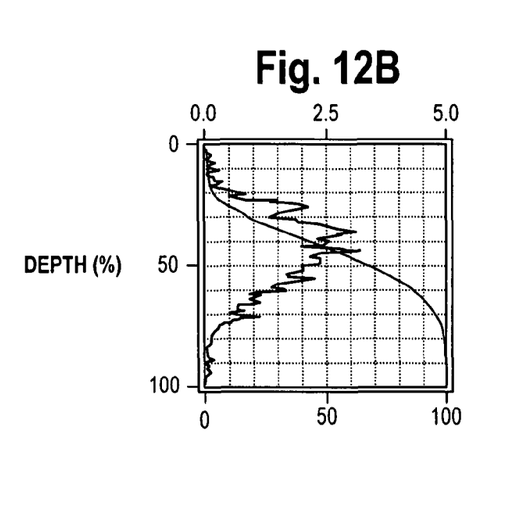
Figure 13B:
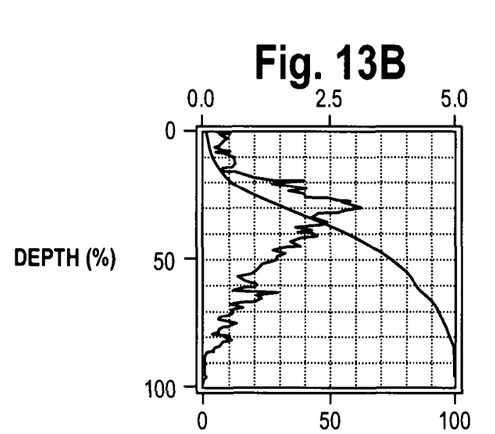
Figure 14B:
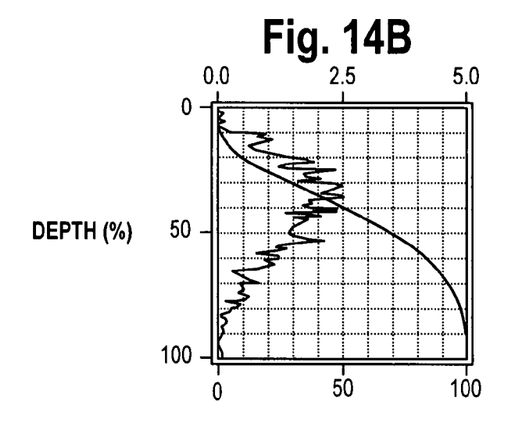

On similar grids, FIG. 12B, FIG. 13B, and FIG. 14B, respectively, for the same traces present the statistical distribution of the measured depths [ from the shallowest ("0") to the deepest ("100")] and, further, the percentages of the surface area that would remain if all material of the porcelain mold above the measured depths were removed.

For each of those traces along the third area, the roughness average (Ra) has been computed. For the first trace along the third area, Ra=18.84 µm. For the second trace along the first area, Ra=17.47 µm. For the third trace along the third area, Ra=21.77 µm.

Empirically, it has been concluded that a porcelain mold having a sandblasted or textured surface having a roughness average (Ra) in a range from about 26 µm to about 35 µm would be satisfactory but that a porcelain mold having a smoother surface, which would have a roughness average (Ra) below about 26 µm would be unsatisfactory, for countering the tendency of a wet latex film to slide down the porcelain mold.

This invention contemplates that, rather than a porcelain mold that has been sandblasted, a porcelain mold made by casting in a suitable form or otherwise and replicating a porcelain mold that has been sandblasted can be alternatively used.

The invention claimed is:

1. An improvement in a method for making an elongate glove on a porcelain mold having a hand-defining portion and having an arm-defining portion, which extends from the hand-defining portion and which has an overall length at least two or more times the overall length of the hand-defining portion,
    wherein the improvement comprises a step of sandblasting or texturing the exterior of at least the arm-defining portion of the porcelain mold before steps of dipping the porcelain mold successively into a bath containing a coagulating agent and into a bath containing a latex, then allowing the porcelain mold to dwell in the bath containing the latex until enough of the latex coagulates to form a wet latex film on the porcelain mold, and then withdrawing the porcelain mold having the wet latex film formed thereon from the bath containing the latex, and wherein the step of sandblasting or texturing produces a roughness average greater than 26 µm selected to control sliding of the latex down the porcelain mold.

2. The improvement of claim 1 wherein the step of sandblasting or texturing produces a roughness average in the range of 26 µm to 35 µm.

3. An improvement in a method for making an elongate glove on a porcelain mold having a hand-defining portion and having an arm-defining portion, which extends from the hand-defining portion and which has an overall length at least two or more times the overall length of the hand-defining portion, wherein the improvement comprises a step of sandblasting or texturing substantially the entire exterior of the porcelain mold before steps of dipping the porcelain mold successively into a bath containing a coagulating agent and into a bath containing a latex, then allowing the porcelain mold to dwell in the bath containing the latex until enough of the latex coagulates to form a wet latex film on the porcelain mold, and then withdrawing the porcelain mold having the wet latex film formed thereon from the bath containing the latex, and wherein the step of sandblasting or texturing produces a roughness average greater than 26 μm selected to control sliding of the latex down the porcelain mold.

4. The improvement of claim 3 wherein the step of sandblasting or texturing produces a roughness average in the range of 26 μm to 35 μm.

5. An improvement in a method for making an elongate glove on a porcelain mold having a hand-defining portion, having an arm-defining portion, which extends from the hand-defining portion, which has an overall length at least two or more times the overall length of the hand-defining portion, and having a substantially conical region, which flares upwardly and outwardly, when the porcelain mold is oriented in a dipping orientation, wherein the improvement comprises a step of sandblasting or texturing the exterior of at least the arm-defining portion of the porcelain mold before steps of dipping the porcelain mold successively into a bath containing a coagulating agent and into a bath containing a latex, then allowing the porcelain mold to dwell in the bath containing the latex until enough of the latex coagulates to form a wet latex film on the porcelain mold, and then withdrawing the porcelain mold having the wet latex film formed thereon from the bath containing the latex, and wherein the step of sandblasting or texturing produces a roughness average greater than 26 μm selected to control sliding of the latex down the porcelain mold.

6. The improvement of claim 5 wherein the step of sandblasting or texturing produces a roughness average in the range of 26 μm to 35 μm.

7. An improvement in a method for making an elongate glove on a porcelain mold having a hand-defining portion, having an arm-defining portion, which extends from the hand-defining portion and which has an overall length at least two or more times the overall length of the hand-defining portion, and having a substantially conical region, which flares upwardly and outwardly, when the porcelain mold is oriented in a dipping orientation, wherein the improvement comprises a step of sandblasting or texturing substantially the entire exterior of the porcelain mold before steps of dipping the porcelain mold successively into a bath containing a coagulating agent and into a bath containing a latex, then allowing the porcelain mold to dwell in the bath containing the latex until enough of the latex coagulates to form a wet latex film on the porcelain mold, and then withdrawing the porcelain mold having the wet latex film formed thereon from the bath containing the latex, and wherein the step of sandblasting or texturing produces a roughness average greater than 26 μm selected to control sliding of the latex down the porcelain mold.

8. The improvement of claim 7 wherein the step of sandblasting or texturing produces a roughness average in the range of 26 μm to 35 μm.

9. The improvement of claim 1 wherein the step of dipping the porcelain mold into a bath containing a coagulating agent is performed before the step of dipping the porcelain mold into a bath containing a latex.

10. The improvement of claim 3 wherein the step of dipping the porcelain mold into a bath containing a coagulating agent is performed before the step of dipping the porcelain mold into a bath containing a latex.

11. The improvement of claim 5 wherein the step of dipping the porcelain mold into a bath containing a coagulating agent is performed before the step of dipping the porcelain mold into a bath containing a latex.

12. The improvement of claim 7 wherein the step of dipping the porcelain mold into a bath containing a coagulating agent is performed before the step of dipping the porcelain mold into a bath containing a latex.

13. The improvement of any one of claims 1, 3, 5 and 7, wherein the latex is a nitrile latex.

14. The improvement of claim 1 wherein the step of sandblasting or texturing the exterior comprises the step of texturing the exterior by casting the porcelain mold to replicate a porcelain mold that has been sandblasted.

15. The improvement of claim 3 wherein the step of sandblasting or texturing the exterior comprises the step of texturing the exterior by casting the porcelain mold to replicate a porcelain mold that has been sandblasted.

16. The improvement of claim 5 wherein the step of sandblasting or texturing the exterior comprises the step of texturing the exterior by casting the porcelain mold to replicate a porcelain mold that has been sandblasted.

17. The improvement of claim 7 wherein the step of sandblasting or texturing the exterior comprises the step of texturing the exterior by casting the porcelain mold to replicate a porcelain mold that has been sandblasted.

18. A method for making an elongate glove on a porcelain mold having a hand-defining portion and an arm defining portion which extends from the hand-defining portion, the method comprising the steps of:

providing a porcelain mold having a hand-defining portion and an arm-defining portion which extends from the hand-defining portion, the arm-defining portion having a substantially cylindrical region and a substantially conical region which flares upwardly and outwardly from the hand-defining portion and which is located between the substantially cylindrical region and the hand-defining portion to produce a roughness average greater than 26 μm selected to control sliding of the latex down the substantially conical region;

sandblasting or texturing the exterior of at least the arm-defining portion of the porcelain mold; and after the step of sandblasting or texturing the exterior of at least the arm-defining portion of the porcelain mold, dipping the porcelain mold successively into a bath containing a coagulating agent and into a bath containing a latex, then allowing the porcelain mold to dwell in the bath containing the latex until enough of the latex coagulates to form a wet latex film on the mold, and then withdrawing the porcelain mold having the wet latex formed thereon from the bath containing the latex.

19. The method of claim 18 wherein the step of sandblasting or texturing produces a roughness average in the range of 26 μm to 35 μm.

20. The method of claim 18 wherein the step of dipping the porcelain mold into a bath containing a coagulating agent is performed before the step of dipping the porcelain mold into a bath containing a latex.

21. The method of claim 18 wherein the step of sandblasting or texturing the exterior comprises the step of texturing the exterior by casting the porcelain mold to replicate a porcelain mold that has been sandblasted.

\* \* \* \* \*